US010437982B2

(12) United States Patent
Kamitani et al.

(10) Patent No.: US 10,437,982 B2
(45) Date of Patent: Oct. 8, 2019

(54) COMMUNICATION MANAGEMENT METHOD AND COMMUNICATION MANAGEMENT SYSTEM

(71) Applicant: Hitachi Solutions, Ltd., Shinagawa-ku, Tokyo (JP)

(72) Inventors: Motoki Kamitani, Tokyo (JP); Masahiko Mano, Tokyo (JP); Ryo Nishimura, Tokyo (JP); Takashi Saito, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 341 days.

(21) Appl. No.: 15/539,782

(22) PCT Filed: Jan. 5, 2016

(86) PCT No.: PCT/JP2016/050165
§ 371 (c)(1),
(2) Date: Jun. 26, 2017

(87) PCT Pub. No.: WO2016/152180
PCT Pub. Date: Sep. 29, 2016

(65) Prior Publication Data
US 2017/0351853 A1     Dec. 7, 2017

(30) Foreign Application Priority Data

Mar. 25, 2015   (JP) .................................. 2015-063016

(51) Int. Cl.
*G06F 15/16*       (2006.01)
*G06F 21/41*       (2013.01)
(Continued)

(52) U.S. Cl.
CPC .............. *G06F 21/41* (2013.01); *G06F 13/00* (2013.01); *G06F 21/604* (2013.01); *G06Q 10/10* (2013.01);
(Continued)

(58) Field of Classification Search
CPC ....... H04L 51/00; H04L 51/046; H04L 51/32; H04L 67/306; G06F 13/00; G06F 21/604
See application file for complete search history.

(56) References Cited

U.S. PATENT DOCUMENTS 8,655,792 B1 *   2/2014  Gauvin ............... G06F 16/9535
                                                 705/319
8,966,590 B2 *   2/2015  Janzer ..................... H04L 63/20
                                                 713/152
(Continued)

FOREIGN PATENT DOCUMENTS

JP    2005-258984 A    9/2005
JP    2007-157099 A    6/2007
(Continued)

OTHER PUBLICATIONS

International Search Report (PCT/ISA/210) issued in PCT Application No. PCT/JP2016/050165 dated Mar. 8, 2016 with English translation (four (4) pages).
(Continued)

*Primary Examiner* — Moustafa M Meky
(74) *Attorney, Agent, or Firm* — Crowell & Moring LLP

(57) ABSTRACT

A communication management method for managing communication made by a plurality of users with a computer including a processor, the computer being accessible to a storage device holding user management information including information on users participating in a community, group management information including information on groups to which the users belong, and community management information including information on the community, and the communication management method comprising steps of: registering, by the processor, in a case of receiving a request to let a group join a community from a client terminal, an administrative user of the group designated by the request to the user management information; registering,
(Continued)

by the processor, the group designated by the request to the group management information; and registering, by the processor, the group designated by the request to the community management information, to allow users belonging to the group to participate in the community.

6 Claims, 13 Drawing Sheets

(51) Int. Cl.

| | | |
|---|---|---|
| *G06F 13/00* | (2006.01) | |
| *G06Q 50/10* | (2012.01) | |
| *G06Q 10/10* | (2012.01) | |
| *H04L 29/08* | (2006.01) | |
| *H04L 12/58* | (2006.01) | |
| *G06F 21/60* | (2013.01) | |
| *H04W 4/08* | (2009.01) | |
| *H04W 4/21* | (2018.01) | |

(52) U.S. Cl.
CPC ............ *G06Q 50/10* (2013.01); *H04L 51/00* (2013.01); *H04L 51/046* (2013.01); *H04L 51/32* (2013.01); *H04L 67/306* (2013.01); *H04W 4/08* (2013.01); *H04W 4/21* (2018.02)

(56) References Cited

U.S. PATENT DOCUMENTS

| | | | | |
|---|---|---|---|---|
| 9,509,721 | B2* | 11/2016 | Janzer | ............... H04L 63/20 |
| 2006/0077952 | A1* | 4/2006 | Kubsch | ............. H04L 67/104 |
| | | | | 370/351 |
| 2008/0249863 | A1* | 10/2008 | Redmond | ............ G06Q 10/10 |
| | | | | 705/14.27 |
| 2012/0042013 | A1 | 2/2012 | Roman et al. | |
| 2012/0047560 | A1* | 2/2012 | Underwood | .......... G06Q 10/06 |
| | | | | 726/4 |
| 2013/0024784 | A1* | 1/2013 | Lifton | ................. G06Q 10/101 |
| | | | | 715/753 |
| 2014/0150068 | A1* | 5/2014 | Janzer | ..................... H04L 63/20 |
| | | | | 726/4 |
| 2014/0222702 | A1* | 8/2014 | Jennings | ............ G06Q 30/0631 |
| | | | | 705/319 |
| 2014/0304338 | A1* | 10/2014 | Lee | ......................... H04L 67/22 |
| | | | | 709/205 |
| 2015/0135280 | A1* | 5/2015 | Janzer | ..................... H04L 63/20 |
| | | | | 726/4 |
| 2017/0048248 | A1* | 2/2017 | Janzer | ..................... H04L 63/20 |
| 2017/0161685 | A1* | 6/2017 | Jennings | ............ G06Q 10/1053 |

FOREIGN PATENT DOCUMENTS

| | | |
|---|---|---|
| JP | 2008-234166 A | 10/2008 |
| JP | 2008-310383 A | 12/2008 |
| JP | 2009-199368 A | 9/2009 |
| JP | 2013-539110 A | 10/2013 |

OTHER PUBLICATIONS

Japanese-language Written Opinion (PCT/ISA/237) issued in PCT Application No. PCT/JP2016/050165 dated Mar. 8, 2016 (four (4) pages).

\* cited by examiner

COMMUNICATION MANAGEMENT METHOD AND COMMUNICATION MANAGEMENT SYSTEM

CLAIM OF PRIORITY

The present application claims priority from Japanese patent application JP 2015-63016 filed on Mar. 25, 2015, the content of which is hereby incorporated by reference into this application.

BACKGROUND OF THE INVENTION

This invention relates to a communication management system for a plurality of users to exchange comments.

For multi-user communication over a network, posting a comment such as a message, photo, and video to a virtual site (community) created on the network is done to share the information among the participants.

Systems for implementing such communication include instant messaging applications and Internet chatting. To create a community in such a system for implementing communication, some ways have been proposed.

One way is that a user who creates a community becomes the administrator of the community and includes users in the community to have communication. Another way is that a participant of the community invites a third person to the community to increase the participants to have communication.

One of the background art of this invention is JP 2009-199368 A. JP 2009-199368 A discloses a technique to maintain the quality of a community by receiving approval of a user already participating in the community before adding a new participant to the community. Such a way for a user to participate in a community is suitable for personal communication or communication within a group having a single purpose.

SUMMARY OF THE INVENTION

The aforementioned existing technique has some problems when different groups make communication in a single community (for example, when companies talk about a business); it can be difficult to employ the existing technique.

Problem 1: Adding a participant to the community increases the load to the community. For example, in a case where Company A and Company B are talking about a business in a community managed by Company B, a user in Company A has to request the administrator in Company B to add a participant. The user in Company A may hesitate to make such a request and as a result, the opportunity to develop the communication might be lost.

Problem 2: The purpose of the participants to join the community becomes unclear as the participants increase. For example, some user may hesitate to say something because the user cannot identify other participants and as a result, the opportunity to develop the communication might be lost.

Problem 3: The community has difficulty in allowing communication confidential to one group. For example, in a community including members outside a company, communication to be kept within the company cannot be made; accordingly, it is required to separately use other communication means such as telephone or e-mail.

Because of these problems, the communication tool is likely to be used in limited situations. Using multiple communication means causes another problem that relevant communication is dispersed to multiple sites. The dispersion of communication may prevent visualization of the communication, which could hinder succession to a third person or information sharing.

This invention is to solve the above-described problems and aims to provide a management system for communication over a network that makes up communication between different groups from communication among individual persons belonging to each group and treats them as a single community.

The representative one of inventions disclosed in this application is outlined as follows. There is provided a communication management method for managing communication made by a plurality of users with a computer. The computer includes a processor configured to execute a program and a memory configured to store the program. The computer is accessible to a storage device holding user management information including information on users participating in a community, group management information including information on groups to which the users belong, and community management information including information on the community. The communication management method comprising steps of: registering, by the processor, in a case of receiving a request to let a group join a community from a client terminal, an administrative user of the group designated by the request to the user management information; registering, by the processor, the group designated by the request to the group management information; and registering, by the processor, the group designated by the request to the community management information, to allow users belonging to the group to participate in the community.

According to a representative aspect of this invention, participation of a user to a community is managed by group; accordingly, a user necessary for the communication between groups can be added as necessary. Problems, configurations, and effects other than those described above are made clear from the following description of an embodiment of this invention.

DETAILED DESCRIPTION OF THE EMBODIMENTS

Figure 1:
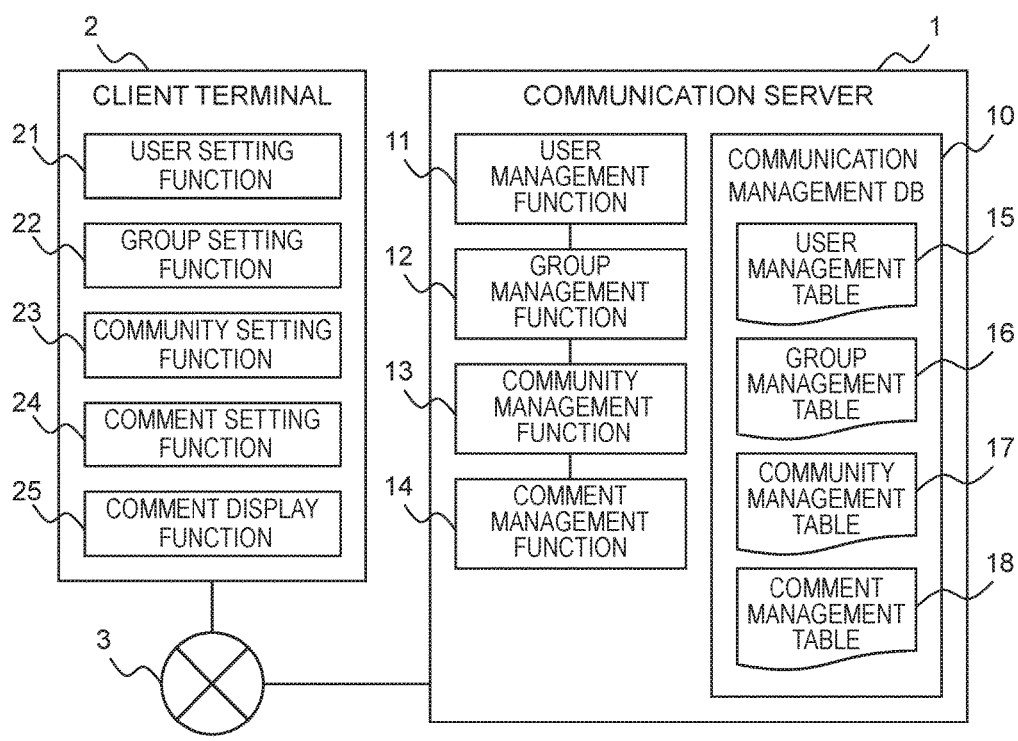
FIG. 1 is a diagram for illustrating a configuration of a communication management system in an embodiment of this invention.

FIG. 1 is a diagram for illustrating a configuration of a communication management system in an embodiment of this invention.

The communication management system according to this embodiment is configured with a communication server 1. The communication server 1 is connected with a client terminal 2 via a network 3.

The communication server 1 includes a communication management database 10, a user management function 11, a group management function 12, a community management function 13, and a comment management function 14. The physical configuration of the communication server 1 will be described using FIG. 2.

Figure 8A:
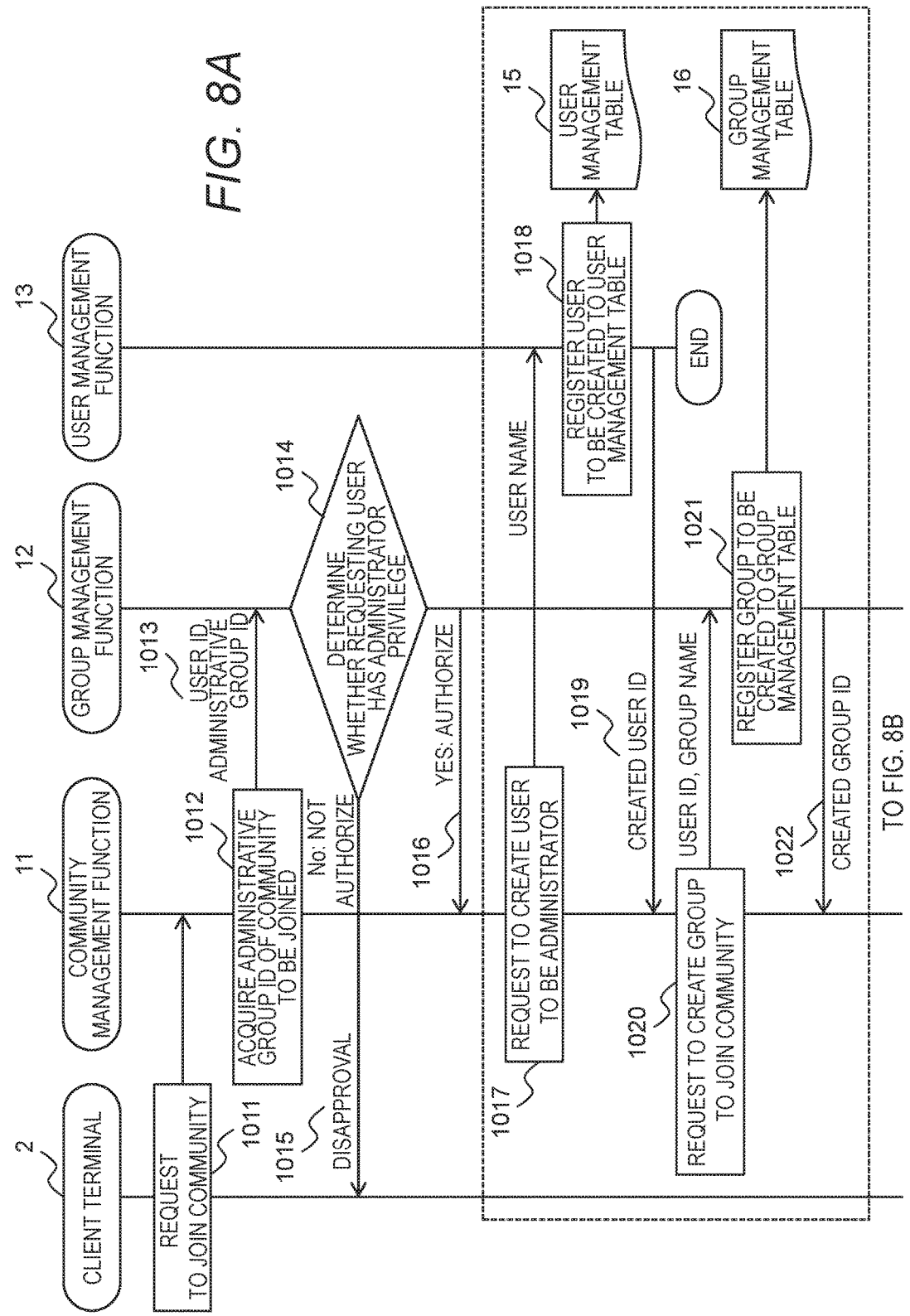
FIGS. 8A and 8B are sequence diagrams of processing to join a community according to this embodiment.
Figure 8B:
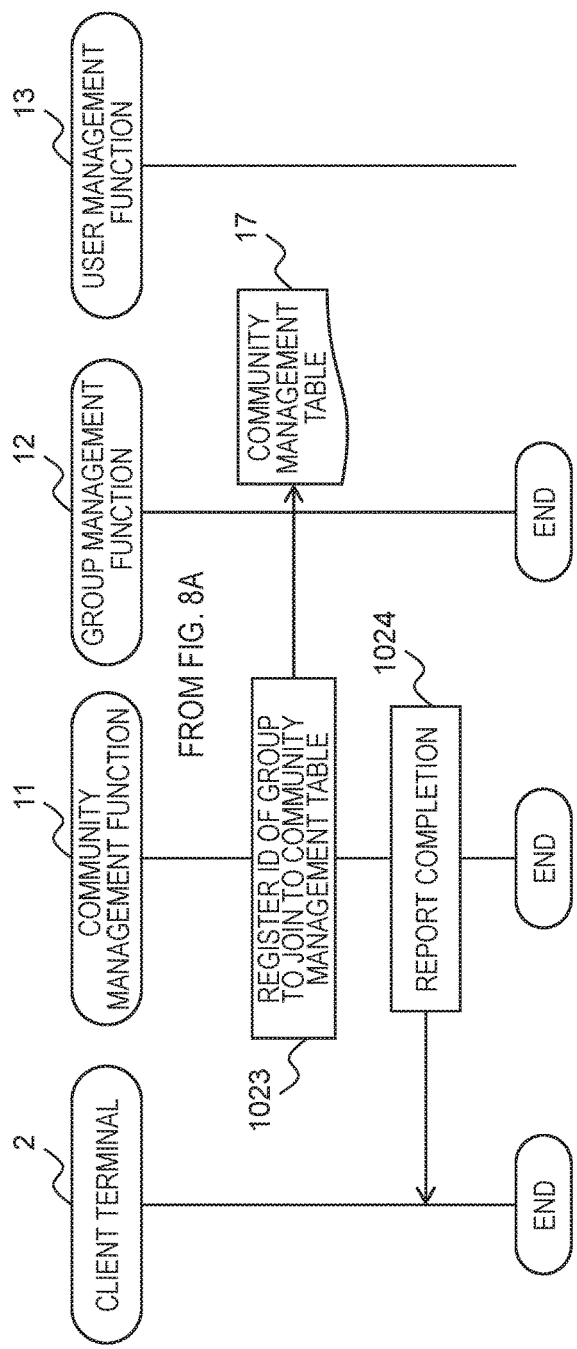
Figure 9:
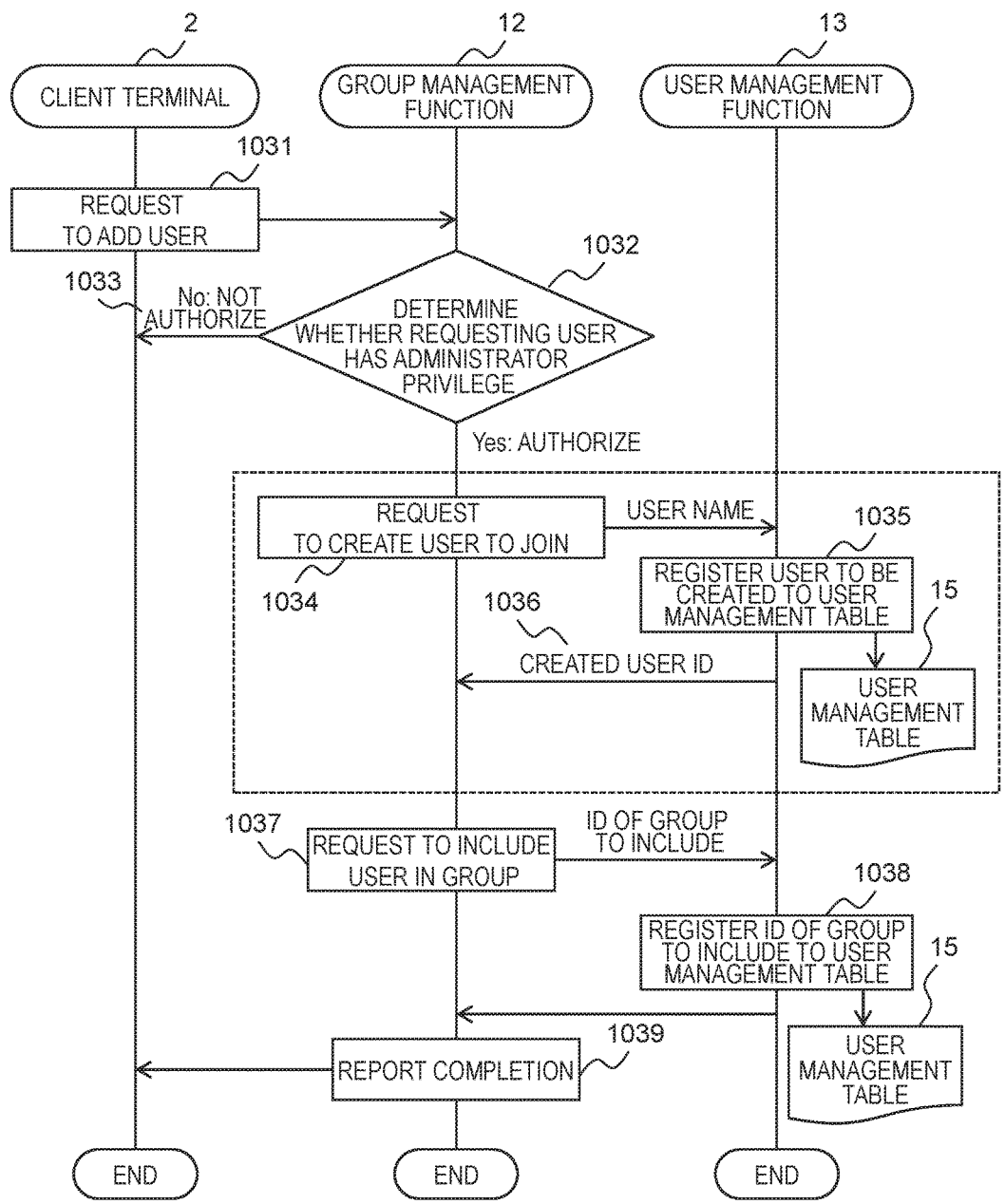
FIG. 9 is a sequence diagram of processing to add a user according to this embodiment.
Figure 10:
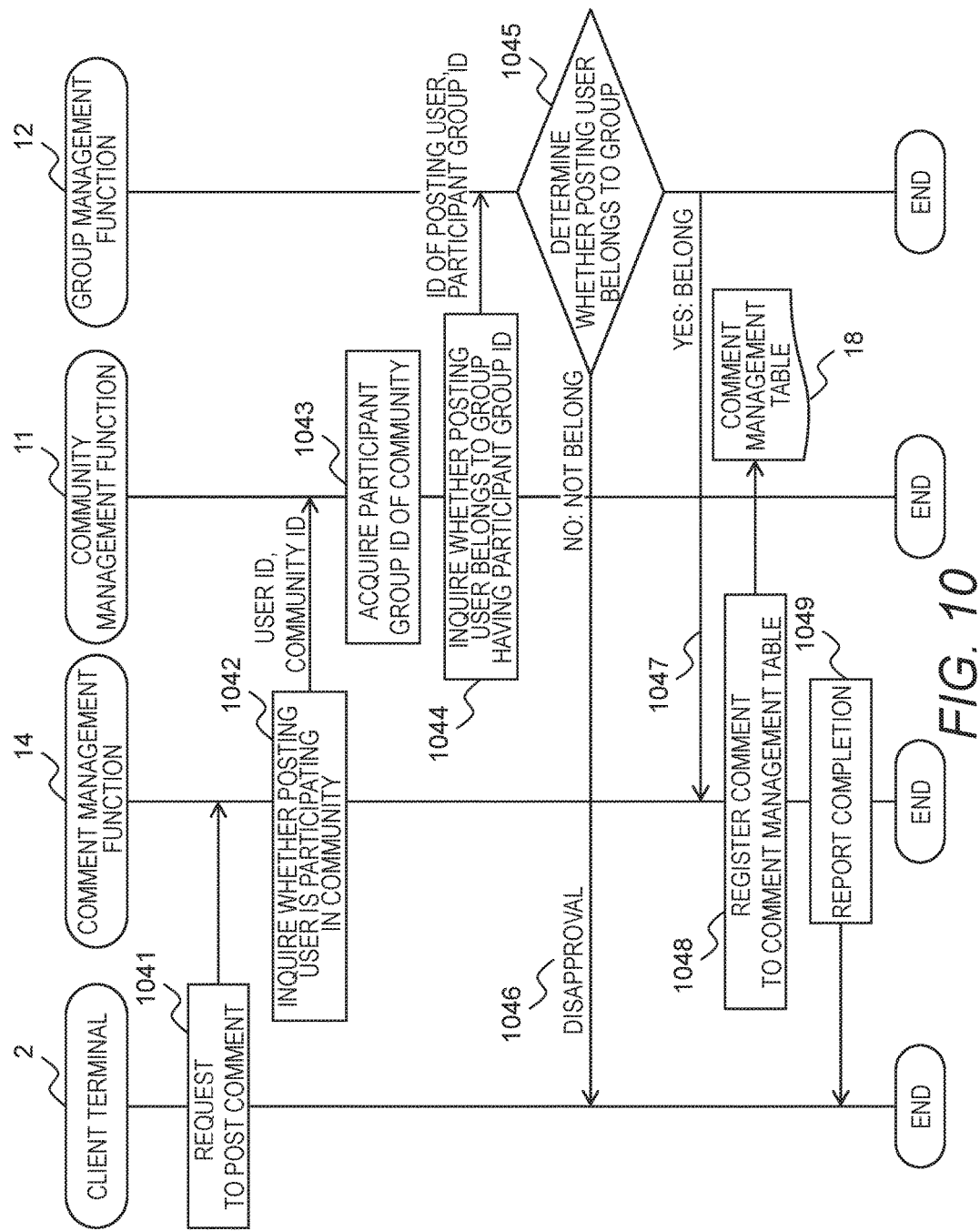
FIG. 10 is a sequence diagram of processing to post a comment according to this embodiment.

The user management function 11 manages users participating in a community with a user management table 15. For example, the user management function 11 performs processing to add a user (FIG. 9). The group management function 12 manages groups participating in a community with a group management table 16. The community management function 13 manages communities with a community management table 17. For example, the community management function 13 performs processing to create a community (FIG. 7) and to join a community (FIGS. 8A, 8B). The comment management function 14 manages posted comments with a comment management table 18. For example, the comment management function 14 performs processing to specify a range to share a comment (FIG. 10).

The communication management database 10 is a database for storing data to be used by the communication server 1 in performing a variety of processing and includes the above-mentioned user management table 15, group management table 16, community management table 17, and comment management table 18.

The user management table 15 is a table for managing users participating in a community. The group management table 16 is a table for managing groups participating in a community. The community management table 17 is a table for managing created communities. The comment management table 18 is a table for managing posted comments.

The client terminal 2 is a computer to be used by a user and includes a user setting function 21, a group setting function 22, a community setting function 23, a comment setting function 24, and a comment display function 25. The physical configuration of the client terminal 2 may be the same as the physical configuration of the communication server 1 illustrated in FIG. 2; specifically, the client terminal 2 can be a personal computer, a tablet terminal, or a smartphone.

The user setting function 21 has functions to make settings about the user. The group setting function 22 has functions to make settings about a group. The community setting function 23 has functions to make settings about a community. The comment setting function 24 has functions to make settings about a comment. The comment display function 25 displays comments acquired from the comment management function. These functions of the client terminal 2 may be configured with a dedicated application or a web browser.

Figure 2:
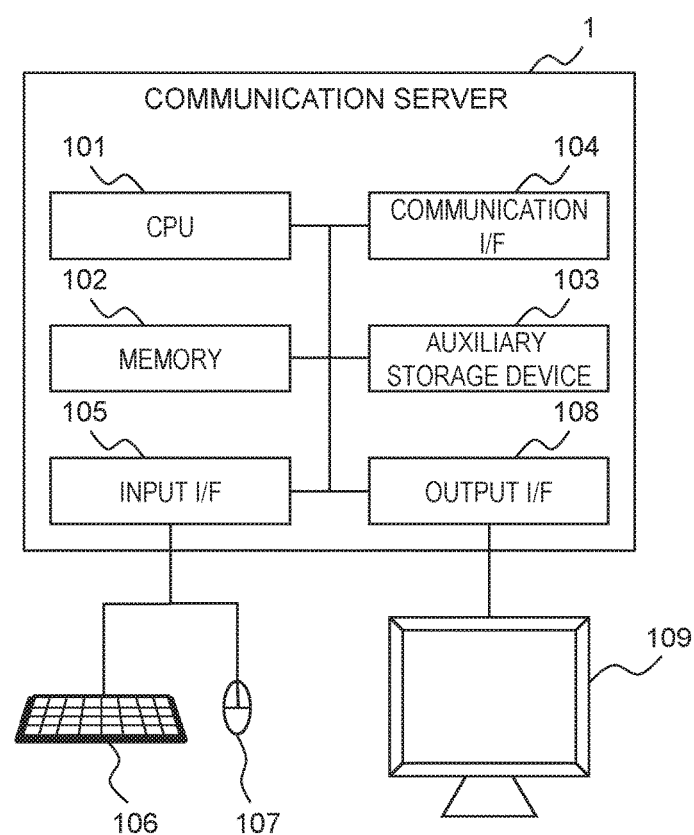
FIG. 2 is a block diagram for illustrating a physical configuration of a communication server.

FIG. 2 is a block diagram for illustrating a physical configuration of the communication server 1.

The communication server 1 is configured with a computer including a processor (CPU) 101, a memory 102, an auxiliary storage device 103, and a communication interface 104.

The processor 101 executes programs stored in the memory 102. The memory 102 includes a ROM of a non-volatile memory unit and a RAM of a volatile memory unit. The ROM stores invariable programs (for example, the BIOS). The RAM is a high-speed and volatile memory unit like a DRAM (Dynamic Random Access Memory) and stores programs to be executed by the processor 101 and data to be used by the processor 101 in executing the programs on a temporary basis.

The auxiliary storage device 103 is a high-capacity and non-volatile storage device such as a magnetic storage device (HDD) or a flash memory (SSD) and stores programs to be executed by the processor 101. That is to say, a program is read from the auxiliary storage device 103, loaded to the memory 102, and executed by the processor 101. The auxiliary storage device 103 holds the communication management database 10 storing the data to be used in executing a program.

The communication interface 104 is a network interface device for controlling communication with other apparatuses (e.g. the client terminal 2) in accordance with a predetermined protocol.

The communication server 1 may include an input interface 105 and an output interface 108. The input interface 105 is an interface connected with a keyboard 106 and/or a mouse 107 and to receive an input from the operator. The output interface 105 is an interface connected with a display device 109 and/or a printer and to output a result of executing a program in a form that can be seen by the operator.

The programs to be executed by the processor 101 are provided to the communication server 1 through a removable medium such as a CD-ROM or a flash memory or via the network and stored to the non-volatile auxiliary storage device 103 of a non-transitory storage medium. For this reason, it is preferable that the communication server 1 include an interface to retrieve data from a removable medium.

The communication server 1 is a computer system configured with a physically single computer or a computer system logically and physically configured with a plurality of computers; the computer system may be operated in separate threads on the same computer, or may be operated on a virtual computer constructed on a plurality of physical computer resources.

Next, the tables included in the communication management database 10 are described. In the following description, only the columns required to perform the processing according to this embodiment are explained. In other words, the tables may include not-illustrated columns. The communication management database 10 is provided in the auxiliary storage device 103 but may be provided in an external storage device connected with the communication server 1.

Figure 3:
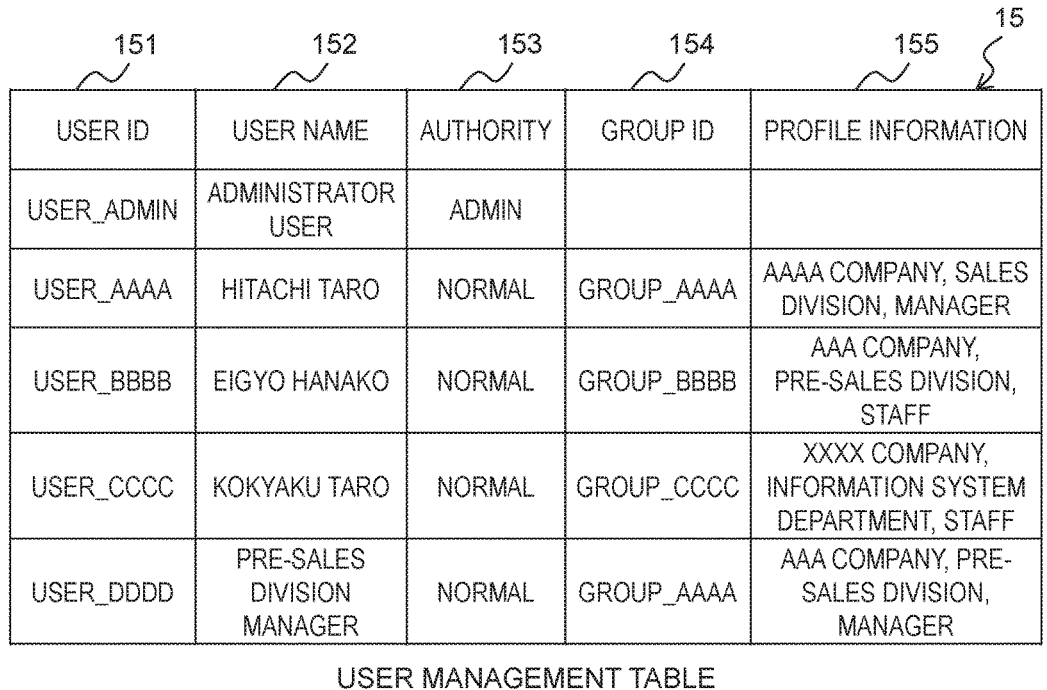
FIG. 3 is a diagram illustrating a configuration example of a user management table according to this embodiment.

FIG. 3 is a diagram illustrating a configuration example of the user management table 15 according to this embodiment.

The user management table 15 is a table for managing users participating in a community and includes a user ID 151, a user name 152, authority 153, a group ID 154, and profile information 155.

The user ID 151 is identification for uniquely identifying a user of the communication management system. The user name 152 is the name of the user, such as a name or a title. The authority 153 is a right assigned to the user; for example, administrator right or normal user right is assigned. The group ID 154 is identification of the group to which the user belongs. The profile information 155 is attributes of the user; for example, the company name, the department name, and the title of the user are recorded.

In a case where one user belongs to a plurality of groups, a plurality of group IDs may be recorded in a group ID 154 or a plurality of entries of the same user different in group ID may be provided.

Figure 4:
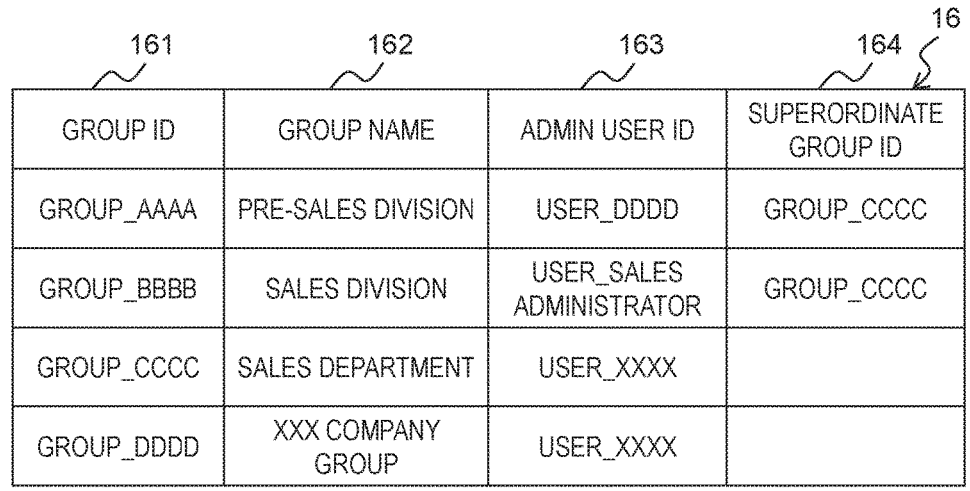
FIG. 4 is a diagram illustrating a configuration example of a group management table according to this embodiment.

FIG. 4 is a diagram illustrating a configuration example of the group management table 16 according to this embodiment.

The group management table 16 is a table for managing groups participating in a community and includes a group ID 161, a group name 162, an administrative user ID 163, and a superordinate group ID 164.

The group ID 161 is identification for uniquely identifying a group a user belongs to. The group name 162 is a name of the group, such as a company name or a department name. The administrative user ID 163 is identification of a user who manages the communication management system in the group. The superordinate group ID 164 is identification of a superordinate group of the group.

The superordinate group ID 164 teaches a hierarchical structure of groups. For example, FIG. 4 teaches that Pre-Sales Division (group ID GROUP_AAAA) and Sales Division (group ID GROUP_BBBB) are subordinate groups of Sales Department (group ID GROUP_CCCC).

Figure 5:
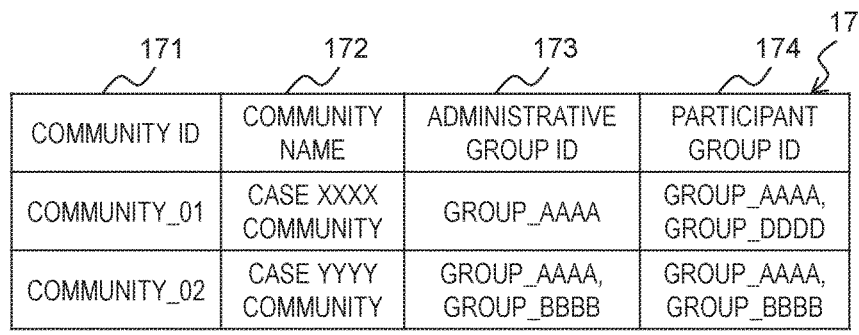
FIG. 5 is a diagram illustrating a configuration example of a community management table according to this embodiment.

FIG. 5 is a diagram illustrating a configuration example of the community management table 17 according to this embodiment.

The community management table 17 is a table for managing created communities and includes a community ID 171, a community name 172, an administrative group ID 173, and a participant group ID 174.

The community ID 171 is identification for uniquely identifying a community. The community name 172 is the name of the community and is determined when the community is created. The administrative group ID 173 is an identification of the group to manage the community. The participant group ID 174 is identification of the groups participating in the community.

Figure 6:
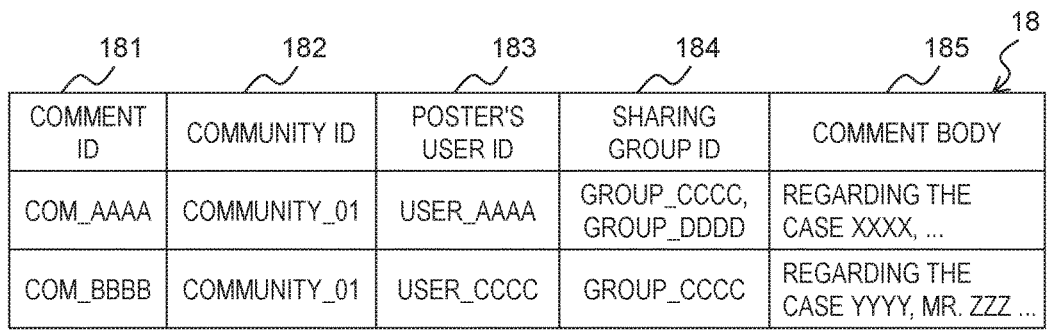
FIG. 6 is a diagram illustrating a configuration example of a comment management table according to this embodiment.

FIG. 6 is a diagram illustrating a configuration example of the comment management table 18 according to this embodiment.

The comment management table 18 is a table for managing posted comments and includes a comment ID 181, a community ID 182, a poster's user ID 183, a sharing group ID 184, and a comment body 185.

The comment ID 181 is identification for uniquely identifying a comment. The community ID 182 is identification of the community to which the comment is posted. The poster's user ID 183 is identification of the user who has posted the comment. The sharing group ID 184 is identification of the group(s) to share the comment. The comment body 185 is the substance of the comment, which may be a text, an attached file, and/or a link.

To start communication between users using the communication management system, it is required to create a community. The community is created by the administrator of the system. The created community is assigned one group to be responsible for management and the group manages the community. At the time of creation of a community, only the group to manage the community is allowed to participate in the community.

Figure 7:
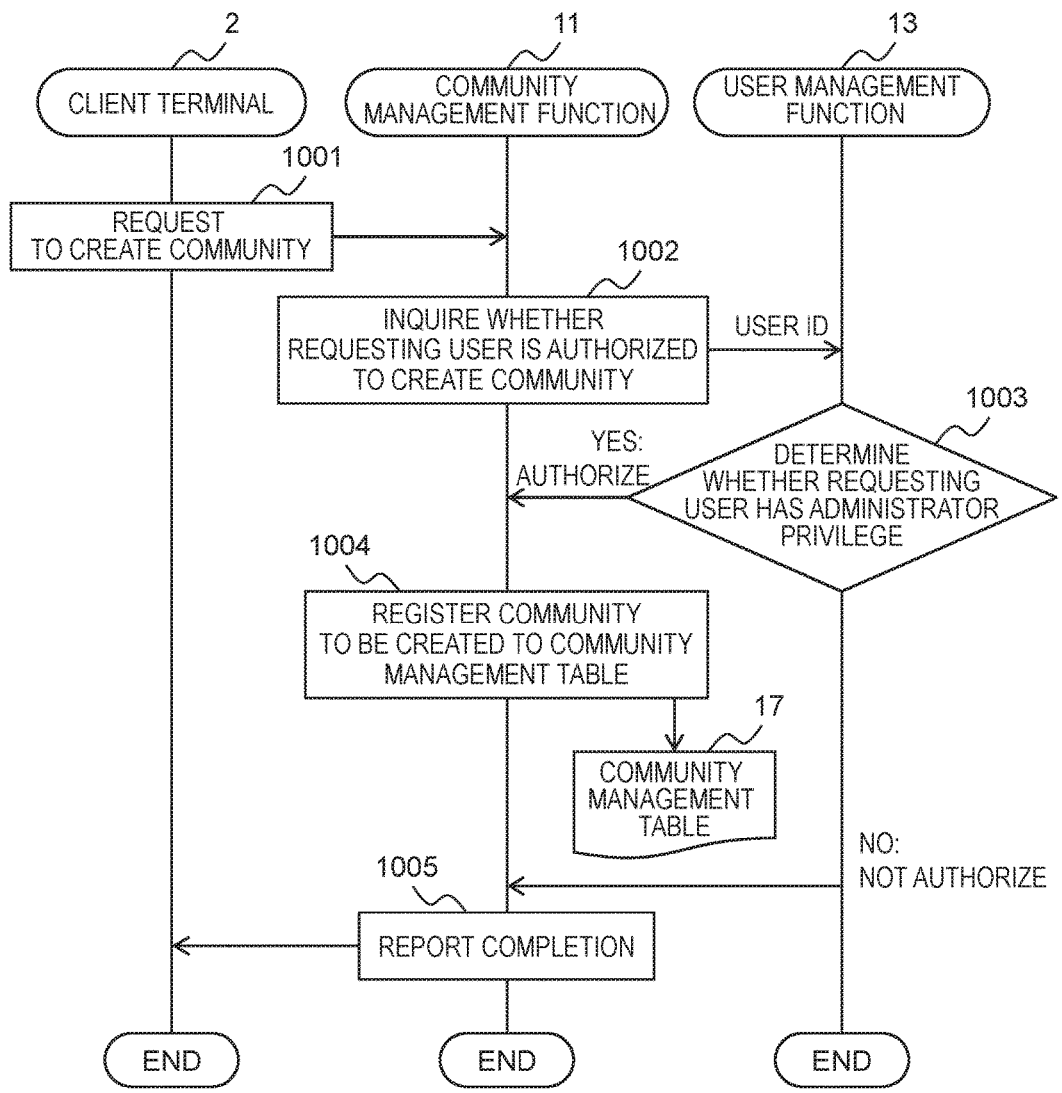
FIG. 7 is a sequence diagram of processing to create a community according to this embodiment.

FIG. 7 is a sequence diagram of processing to create a community according to this embodiment.

First, the person who wants to create a community inputs information on the community to be created, inclusive of the community name, the group ID of the group to manage the community, the group ID of the group to participate in the community, and the user ID of the user who creates the community, to the client terminal 2 and requests the community management function 13 to create a community (1001).

The community management function 13 sends the user ID of the user who has requested creation of a community to the user management function 11 to inquire whether the person who has requested creation of a community is authorized to create a community (1002).

The user management function 11 determines whether the user who has requested creation of a community has administrator right by consulting the authority 153 of the user management table 15 with the user ID and sends a response indicating that the user has administrator right or not to the community management function 13 (1003).

In a case where the user who has requested creation of a community has administrator right, the community management function 13 registers the entered community name to the community name 172 of the community management table 17 to create a community (1004). Furthermore, the community management function 13 registers the group to manage the community to the administrative group ID 173 and the participant group ID 174. At the time of creation of the community, only the group to manage the community is registered in the participant group ID 174 and allowed to use the community. In creating the community, processing to join the community (FIGS. 8A and 8B) may be executed to allow an existing group to participate in the community.

Thereafter, the community management function 13 notifies the client terminal 2 of completion (1005).

FIGS. 8A and 8B are sequence diagrams of processing to join a community according to this embodiment.

A person who wants a group to join a community inputs information on the group to join, inclusive of the ID of the community to be joined, the name of the group to join, and the name of the administrative user of the group to join, to the client terminal 2 and requests the community management function 13 to let the group join the community (1011).

The community management function 13 acquires the administrative group ID of the community to be joined with reference to the community management table 17 (1012) and sends the administrative group ID and the user ID of the user who has requested join of a group to the group management function 12 (1013).

The group management function 12 determines whether the user who has requested join of a group is the administrative user of the group managing the community with reference to the administrative user ID 163 in the group management table 16 (1014). In a case where the user who has requested the join is not the administrative user, the group management function 12 notifies the client terminal 2 of disapproval of the join in the community (1015). In a case where the user who has requested the join is the administrative user, the group management function 12 notifies the community management function 13 that the user is the administrative user (1016).

The community management function 13 sends the name of the administrative user of the group received from the client terminal 2 to the user management function 11 to request creation of an administrative user (1017). The user management function 11 registers a new user to the user management table 15 (1018) and sends the user ID of the user registered in the user management table 15 to the community management function 13 (1019).

Next, the community management function 13 sends the user ID of the administrative user and the name of the group to join received from the client terminal 2 to the group management function 12 to request the group management function 12 to create a group to belong to the community (1020). The group management function 12 registers the group to join the community to the group management table 16 (1021) and sends the group ID of the group registered in the group management table 16 to the community management function 13 (1022).

Thereafter, the community management function 13 registers the group ID of the group to join to the participant group ID 174 in the community management table 17 (1023). After completion of the registration to the community management table 17, the community management function 13 notifies the client terminal 2 of completion (1024).

It should be noted that Steps 1017 to 1022 are not necessary in a case where an already created group joins a community.

The above-described processing to join a community enables a group to join a community, so that the community can increase the participants. In a case where a new group joins the community, the processing newly creates the group and the administrative user to let them join the community. Furthermore, the processing registers the administrative user to allow the administrative user to manage to which the users belonging the group.

FIG. 9 is a sequence diagram of processing to add a user according to this embodiment.

A person who wants a user to join a community inputs information on the user to join, inclusive of the group ID of the group to include the user and the user ID of the user to be included in the group, to the client terminal 2 and requests the group management function 12 to let the user join the community (1031). In a case where the user is not an existing user but a new user, the user name and profile information on the user to be included in the group, instead of the user ID, should be input.

The group management function 12 determines whether the user who has requested join of a user is the administrative user of the designated group with reference to the group management table 16 (1032). In a case where the user who has requested the join is not the administrative user, the group management function 12 notifies the client terminal 2 of disapproval of the join in the community (1033). In a case where the user who has requested the join is the administrative user, the group management function 12 sends the user name and the profile information received from the client terminal 2 to the user management function 11 and requests creation of the user to join (1034).

The user management function 11 registers the new user to the user management table 15 (1035). The user management function 11 notifies the client terminal 2 of the created user ID of the user (1036). The profile information registered in the user management table 15 assists in clarifying the role of the user. An example of the screen to register the profile information on a user will be described later with FIG. 14.

Thereafter, the group management function 12 sends the group ID of the group to which the user should belong to the user management function 11 and requests the user management function 11 to include the user in the group (1037).

The user management function 11 registers the group ID of the group to which the user should belong to the group ID 154 of the user management table 15 (1038) and notifies the group management function 12 of completion of the registration.

Subsequently, the group management function 12 notifies the client terminal 2 of the completion (1039).

The above-described processing to add a user enables the administrative user of each group to add a user to the group as necessary and let the user join the community. In the case of a new user, profile information is registered to the user management table 15 to clarify the role of the new user to the other users.

FIG. 10 is a sequence diagram of processing to post a comment according to this embodiment.

First, a user who wants to post a comment inputs information on the comment to be posted, inclusive of the community ID of the community to post the comment, the body of the comment, and the group ID of the group to share the comment, to the client terminal 2 and requests the comment management function 14 to post the comment (1041). The group ID of the group to share the comment is optional unless the range to disclose the comment needs to be restricted.

In a case of receipt of the comment, the comment management function 14 sends the user ID and the community ID to the community management function 13 to inquire whether the user is participating in the community (1042).

The community management function 13 acquires the participant group ID 174 of the community where to post the comment with reference to the community management table 17 (1043). The community management function 13 sends the user ID of the posting user and the participant group IDs acquired from the community management table 17 to the group management function 12 and inquires whether the user belongs to a group participating in the community (1044).

The group management function 12 determines whether the posting user belongs to a group participating in the community with reference to the group management table 16 (1045). In a case where the posting user does not belong to such a group, the group management function 12 notifies the client terminal 2 of disapproval of the posting.

In a case where the user belongs to such a group, the group management function 12 notifies the comment management function 14 that the user belongs to the community (or such a group) (1047).

The comment management function 14 records the comment to the comment management table 18 by recording the user ID of the posting user to the poster's user ID 183, the body of the posted comment to the comment body 185, the group ID of the group to share the comment to the sharing group ID 184 (1048). It should be noted that, in a case where the range to disclose the comment should be restricted, the group ID of the group to share the comment entered to the client terminal 2 is recorded to the sharing group ID 184 and in a case where the restriction is not necessary, a null is recorded to the sharing group ID 184.

Subsequently, the comment management function 14 notifies the client terminal 2 of completion (1049).

The above-described processing to post a comment enables the poster of a comment to specify the range to share the comment when posting the comment.

Figure 11:
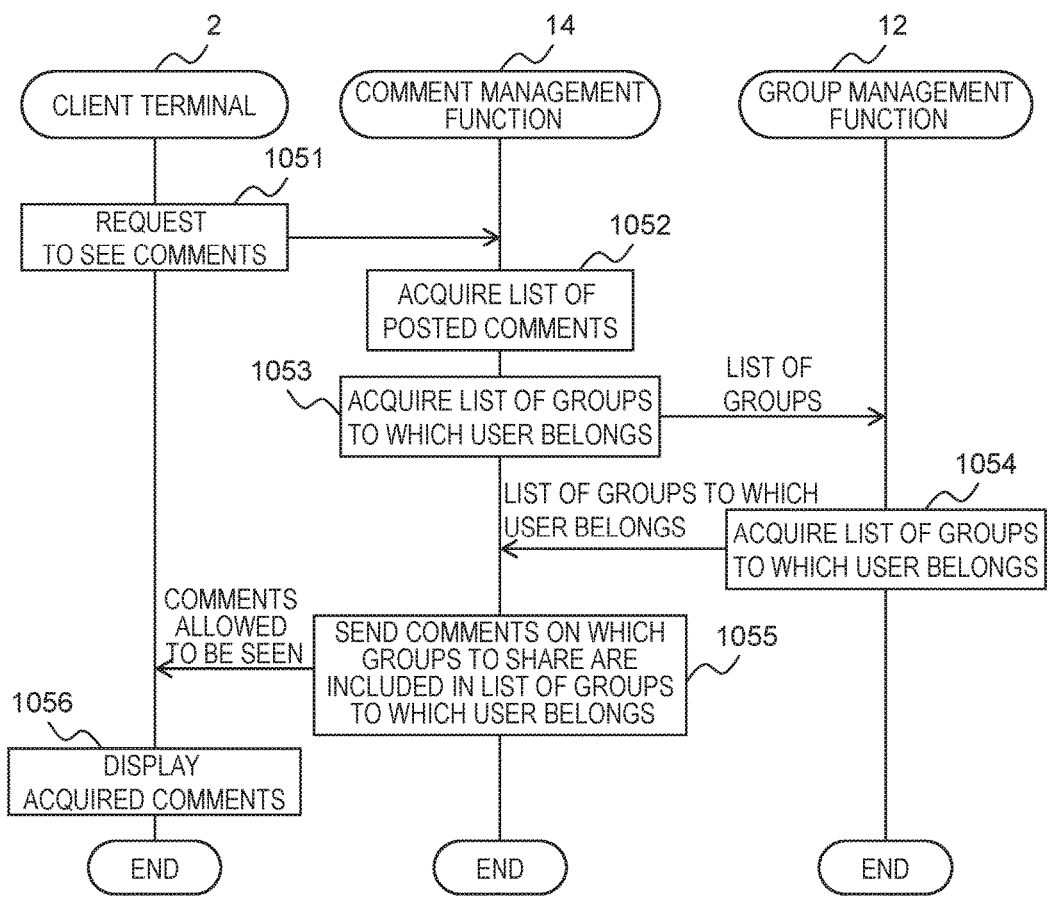
FIG. 11 is a sequence diagram of processing to see comments according to this embodiment.

FIG. 11 is a sequence diagram of processing to see comments according to this embodiment.

The user who wants to see comments first inputs the community ID of the community to be accessed to the client terminal 2 and requests the comment management function 14 to see comments (1051).

The comment management function 14 acquires a list of comments posted to the community from the comment management table 18 with the community ID of the community to be accessed (1052). Furthermore, the comment management function 14 acquires a list of the groups to which the user belongs from the user management table 15 and sends the user ID and the acquired group IDs to the group management function 12 (1053).

The group management function 12 acquires a list of the group IDs of the groups to which the user belongs (namely, a list of superordinate groups of the group IDs acquired from the comment management function 14) from the group management table 16 and sends the list to the comment management function 14 (1054).

The comment management function 14 sends the comments on which the group IDs to share the comment are included in the list of the group IDs acquired from the group management function 12 to the client terminal 2 (1055).

The client terminal 2 (comment display function 25) displays the acquired comments (1056).

The above-described processing to see comments enables the user to see only the comments disclosed to the groups to which the user belongs but does not allow the user to see the undisclosed comments.

In the communication management system according to this embodiment, how the comments in a community look like depends on the user. That is to say, in a case where a range to share is set to a comment, the comment is controlled to be seen only the users of a group allowed to see the comment.

Figure 12:
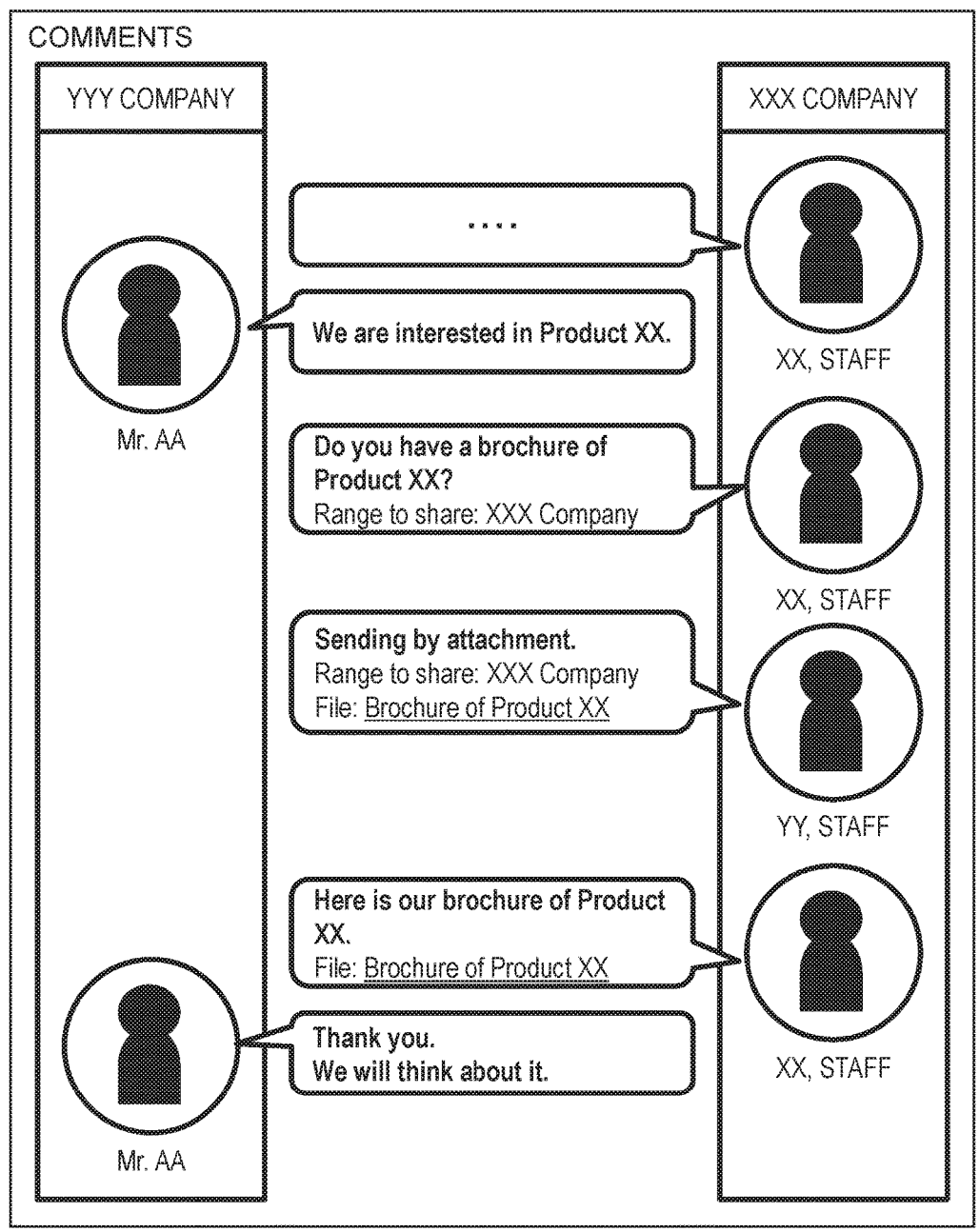
FIGS. 12, 13 and 14 are diagrams illustrating examples of communication display screens according to this embodiment.
Figure 13:
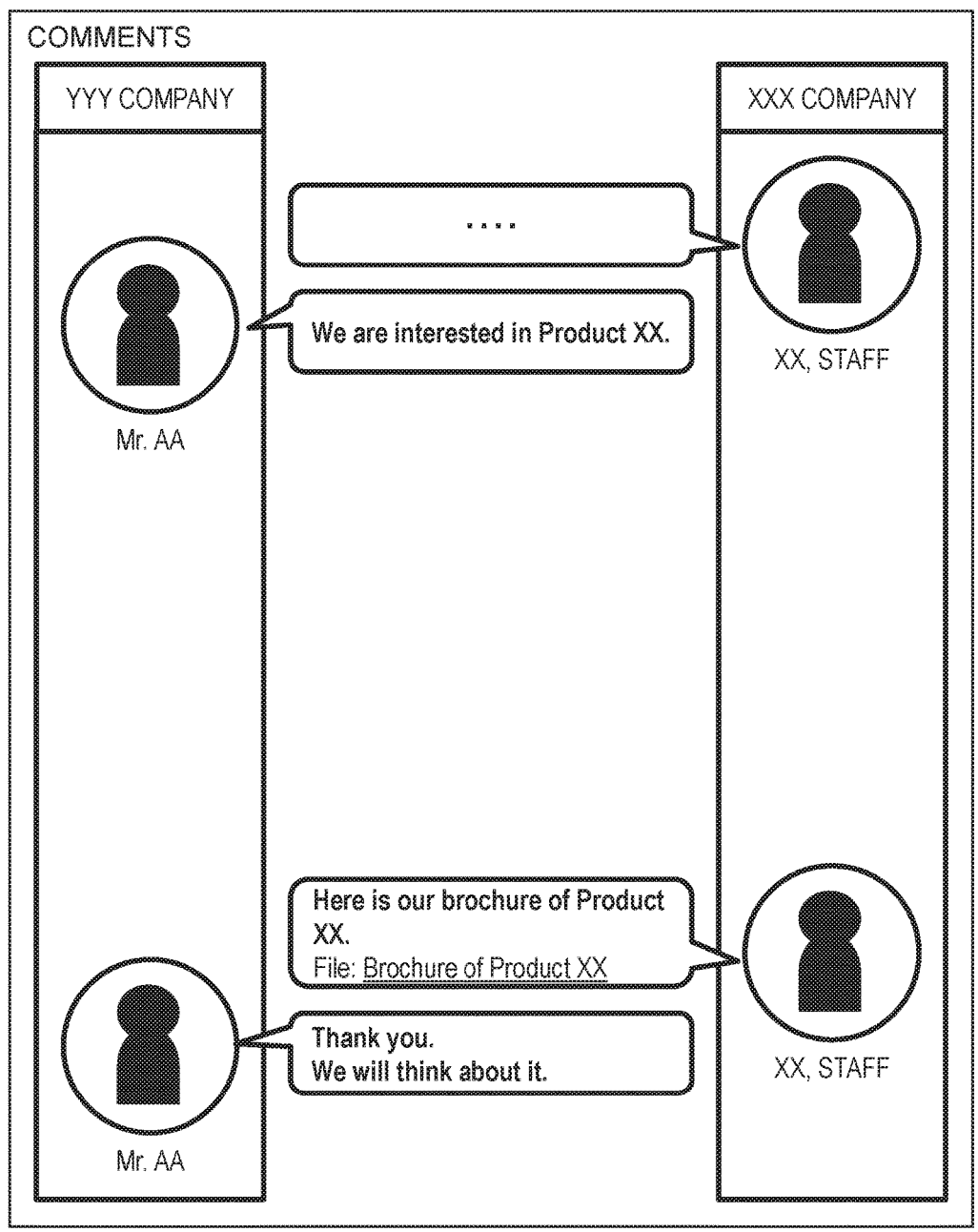

FIGS. 12 and 13 are diagrams illustrating examples of communication display screens displayed by the comment display function 25 on the display device of the client terminal 2. FIG. 12 illustrates an example in which all comments generated in a community are displayed and FIG. 13 illustrates the comments to be seen by a user AA of YYY Company.

The communication display screen illustrated in FIG. 12 indicates all comments posted by all users included in the community (the user AA of YYY Company, and users XX and YY of XXX Company).

On the communication display screen illustrated in FIG. 13, the communication between the user XX and the user YY belonging to XXX Company cannot be seen by the users who do not belong to XXX Company (specifically, the user AA belonging to YYY Company) because the range to share the communication is restricted to XXX Company. Accordingly, the communication display screen to be seen by the user AA of YYY Company does not illustrated the communication between the user XX and the user YY.

Figure 14:
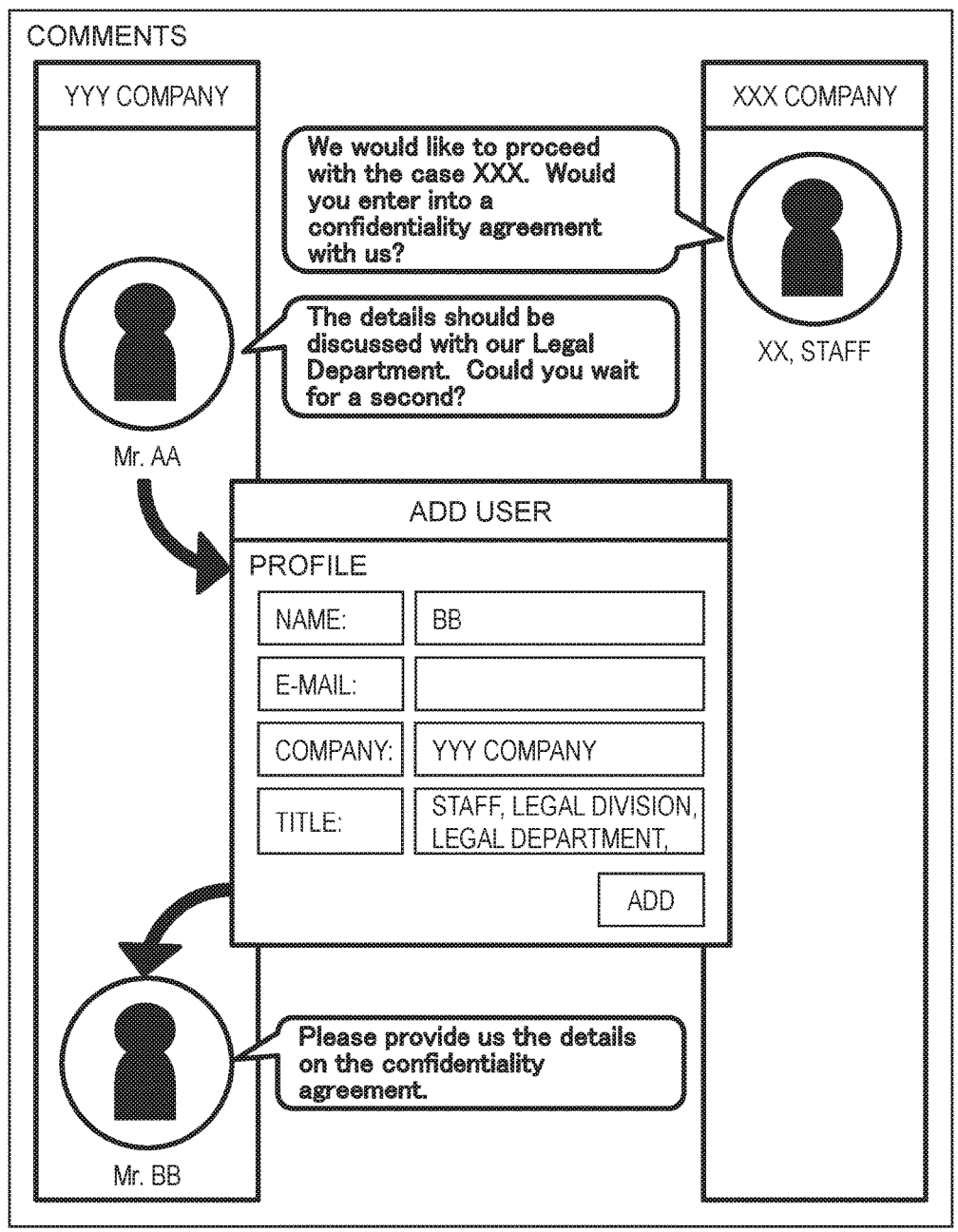

FIG. 14 is a diagram illustrating an example of a communication display screen displayed by the comment display function 25 on the display device of the client terminal 2, including an example of a sub-screen to enter profile information on a new user to be added.

The sub-screen to add a user is opened by selecting "Add User" in a function menu, which is displayed in response to a left-click (or a long press) of the area indicating the users of the operator's company, for example. The operator enters profile information on the user to be added, inclusive of the name, the e-mail address, the department and division, and the title of the user to be added, to the Add User screen. In response to operation of the ADD button, the user setting function 21 of the client terminal 2 sends the information on the user to be added to the group management function 12 of the communication server 1.

According to the above-described embodiment of this invention, In a case where the community management function 13 receives a request to let a group join a community from a client terminal 2, the user management function 11 registers the administrative user of the group to the user management table 15, the group management function 12 registers the group to the group management table 16, and the community management function 13 registers the group to the community management table 17 to allow a user belonging to the group to participate in the community. Accordingly, participation of a user to the community can be managed by group and a new user necessary for the communication between groups can be added as necessary. Furthermore, communication between individual persons belonging to different groups can be developed to communication between the groups, which can be treated as a single community. This configuration can solve Problem 1.

In a case where the group management function 12 receives a request to include a user in a group from a client terminal 2, the group management function 12 registers entered information on the user including profile information to the user management table 15. Thus, the user can participate in the community by joining the group. The profile information on the user clarifies the position of the user for the other users participating in the communication.

In a case where the comment management function 14 receives a request to post a comment from a client terminal 2, the group management function 12 determines whether the participant who has posted the comment belongs to a group participating in the community with reference to the group management table 16 and in a case where the participant belongs to such a group, the comment management function 14 registers the comment to the comment management table 18 together with information on the group to share the comment. Restricting the range to disclose a comment enables a single community to handle communication within a group and communication between groups. This configuration can solve Problem 3.

In a case where the comment management function 14 receives a request to see comments from a client terminal 2, the group management function 12 acquires a list of groups the user who has made the request to see comments belongs to and in a case where the list of groups acquired by the group management function 12 includes the group to share a given comment, the comment management function 14 outputs information on the comment to the client terminal 2. Accordingly, posted comments can be disclosed within a restricted range.

In a case where the community management function 13 receives a request to let a group join a community from a client terminal 2, the group management function 12 determines whether the user who has made the request is an administrative user with reference to the group management table 16 and in a case where the user is an administrative user, the community management function 13 proceeds with registration of the administrative user to the user management table 15, registration of the group to the group management table 16, and registration of the group to the community management table 17. Letting a user join a community is permitted only to the administrative user of each group, so that adding a user necessary for the communication with another group can be added by discretion of the group.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A communication management method for managing communication made by a plurality of users with a computer,
    the computer including a processor configured to execute a program and a memory configured to store the program,
    the computer being accessible to a storage device holding user management information including information on users participating in a community, group management information including information on groups to which the users belong, and community management information including information on the community, and
    the communication management method comprising steps of:
    registering, by the processor, in a case of receiving a request to let a group join a community from a client terminal, an administrative user of the group designated by the request to the user management information;
    registering, by the processor, the group designated by the request to the group management information; and
    registering, by the processor, the group designated by the request to the community management information, to allow users belonging to the group to participate in the community.

2. The communication management method according to claim 1, further comprising a step of registering, by the processor, in a case of receiving a request to include a user in a group from the client terminal, information on the group to include the user and information on the user inclusive of entered profile information to the user management information.

3. The communication management method according to claim 1,
    wherein the computer is accessible to comment management information including information on comments posted to the community, and
    wherein the communication management method further comprises steps of:
    determining, by the processor, in a case of receiving a request to post a comment to the community from the client terminal, whether a user who has posted the comment belongs to a group participating in the community with reference to the community management information and the group management information; and
    registering, by the processor, the comment to the comment management information together with information on a group to share the comment in a case where to which the user belongs a group participating in the community.

4. The communication management method according to claim 3, further comprising steps of:
    acquiring, by the processor, in a case of receiving a request to see the comment from the client terminal, a group including a user who has made the request to see the comment from the group management information; and
    outputting, by the processor, in a case where the acquired group is included in groups to share the comment, information on the comment to the client terminal.

5. The communication management method according to claim 1, further comprising a step of determining, by the processor, in a case of receiving a request to let a group join the community from the client terminal, whether a user who has made the request to let the group join the community is an administrative user with reference to the group management information,
    wherein the processor performs the registration of the administrative user to the user management information, the registration of the group to the group management information, and the registration of the group to the community management information after determining that the user is an administrative user.

6. A communication management system configured to manage communication made by a plurality of users,
    the communication management system being configured with a computer including a processor configured to execute a program and a memory configured to store the program,
    the communication management system being accessible to user management information including information on users participating in a community, group management information including information on groups to which the users belong, and community management information including information on the community, and
    the communication management system comprising:
    a user management unit configured to manage the users;
    a group management unit configured to manage the groups; and
    a community management unit configured to manage the community,
    wherein, in a case where the community management unit receives a request to let a group join the community from a client terminal, the user management unit registers an administrative user of the group designated by the request to the user management information, the group management unit registers the group designated by the request to the group management information, and the community management unit registers the group designated by the request to the community management information to allow users belonging to the group to participate in the community.

* * * * *